United States Patent [19]
Kaner et al.

[11] Patent Number: 6,096,282
[45] Date of Patent: Aug. 1, 2000

[54] INSTANTANEOUS SYNTHESIS OF REFRACTORY NITRIDES FROM SOLID PRECURSORS

[75] Inventors: Richard B. Kaner, Santa Monica; Charles H. Wallace, Corte Madera; Thomas K. Reynolds, Riverside, all of Calif.

[73] Assignee: The Regents of the University of California, Oakland, Calif.

[21] Appl. No.: 09/066,722

[22] Filed: Apr. 23, 1998

Related U.S. Application Data

[63] Continuation-in-part of application No. PCT/US97/15859, Sep. 9, 1997.
[60] Provisional application No. 60/025,187, Sep. 10, 1996.
[51] Int. Cl.[7] .................................................. C01B 21/06
[52] U.S. Cl. ............................................................. 423/409
[58] Field of Search .................................. 423/409, 411, 423/412

[56] References Cited

U.S. PATENT DOCUMENTS 5,453,407  9/1995  Chung et al. ............................. 501/96

FOREIGN PATENT DOCUMENTS

| 53-62800 | 6/1978 | Japan ..................................... 423/409 |
| 55-47211 | 4/1980 | Japan ..................................... 423/409 |
| WO 93/06042 | 4/1993 | WIPO . |

*Primary Examiner*—Wayne Langel
*Attorney, Agent, or Firm*—Koppel & Jacobs; Michael J. Ram

[57] ABSTRACT

A process for forming high quality crystalline refractory materials, particularly gallium (III) nitride (GaN), from solid precursors. By blending dry reactants, including $NH_4Cl$, in an oxygen and moisture free environment, placing the reactants in a reaction vessel and in an inert environment, rapidly exposing the reactants to a temperature in excess of about 225° C. The soluble salt by-products are then extracted from the resultant mixture, leaving high purity crystals of the nitride in the form of a fine powder.

14 Claims, 6 Drawing Sheets fig. 3 fig. 4 fig. 5

INSTANTANEOUS SYNTHESIS OF REFRACTORY NITRIDES FROM SOLID PRECURSORS

CROSS REFERENCE TO RELATED APPLICATION

This application is a continuation-in-part of PCT Application No. PCT/US97/15859 filed Sep. 9, 1997 identifying the United States as an elected country, said PCT application claiming priority based on provisional U.S. patent application Ser. No. 60/025,187, filed Sep. 10, 1996.

The high pressure procedure described below was made in part with support from the National Science Foundation Grant Number DMR 9315914 and the ambient pressure procedure using $NH_4Cl$ was made in part with support from the National Science Foundation Grant Number DMR 9704964.

BACKGROUND

The present invention relates to a process for forming high quality crystalline refractory materials, particularly gallium (III) nitride (GaN), from solid precursors.

GaN is a material newly available for use in the opto-electronics industry for the fabrication of light-emitting diodes (LEDs) and blue lasers. It is also possible that doped GaN crystals may have utility as semiconductors. A particularly suitable application is the replacement of standard light bulbs in large outdoor displays, traffic lights and street lighting by GaN LEDs. GaN crystals, when properly activated, fluoresce producing a bright blue glow which is about 60 times brighter than the best GaP based yellow-green LEDs and many times brighter than a standard light bulb which it would replace. Further, a GaN LED display would have an operating life far in excess of the standard light bulb.

Currently, bulk quantities of high purity, polycrystalline gallium nitride are not available. Current techniques to produce such materials require maintaining reactants at high temperatures and pressures for long periods of time. Prior attempts to manufacture GaN by reacting gallium iodide with lithium nitride, without highly elevated pressures, which appears to be a suitable approach, produces elemental Ga, nitrogen and LiI and not GaN.

An alternative approach would be to find a way to lower the reaction temperature. Inert additives such as various salts have been used to lower the temperatures of other metathesis reactions. However, this leads to less crystalline products. (Wiley, J. B. and Kaner, R. B., *Science*, 2255, 1093 (1992)). Inert salt additives (e.g. NaCl, LiCl, LiI, etc.) do not participate in the chemical reaction. Their presence lowers the temperature of the reaction by acting as a heat sink and diluting the reactants. Research has shown that addition of inert salts slows the propagation of reactions but also results in unacceptable product crystallinity. When too much salt is added, specific to each particular reaction, the reaction lacks the energy to self-propagate and will only react if externally heated. In theory, addition of 6.2 or more moles of lithium chloride (a common inert salt additive) should lower the reaction temperature enough ($\leq 940°$ K.) to favor the formation of gallium nitride under ambient pressure. Tests show that the addition of an inert salt in the predicted amounts does lower the temperature of the reaction; however GaN does not crystallize as a product.

Rodriguez, et al. used $NH_4Cl$ in the SHS synthesis of $Si_3N_4$ to aid in the nitridization of Si. (M. A. Rodriguez, N. S. Makhonin, J. A. Escrina, I. P. Brovinkaya, M. I. Osendi, M. F. Barba, J. E. Iglesias, J. S. Moya, *Adv. Mater.*, 7, 8 (1995)). This process consisted of a Si powder, seed crystals of $\beta$-$Si_3N_4$ and $NH_4F$ compacted and detonated under 100 atm nitrogen overpressure for 30 minutes to produce crystalline $\beta$-$Si_3N_4$.

U.S. Pat. No. 5,453,407 is directed to the formation of nitride ceramic powders by mixing selected powdered metals, including Si, B, Al, Zr, Ti, Cr, and V, with a solid state nitride, an ammonium salt and an igniting agent in nitrogen at 1 to 10 atm. to form a powdered nitride of the metal. The igniting agent is identified as a critical part of the procedure. However, there is no suggestion this process is suitable to form GaN.

Thus there is a need for a low cost, rapid process to produce large quantities of powdered crystalline materials, particularly GaN, for use in such applications as lighting, signal displays, and flat screen displays for computers and television screens.

SUMMARY

These needs are met by the present invention which comprises a low temperature, low pressure process for directly forming crystals of refractory nitrides by blending suitable dry reactants in an oxygen and moisture free environment, placing the reactants in a sealed vessel, and rapidly exposing the reactants to a temperature in excess of about 225° C. The soluble salt by-products are then extracted from the resultant mixture, leaving high purity crystals of the nitride in the form of a fine powder. In the process set forth in applicants' parent application, the reactants are pressurized to in excess of 5 kilobars (5000 atmospheres).

The invention can be used for preparing a wide variety of refractory materials. However, it is particularly suitable for preparing gallium nitride (GaN). In a first embodiment $GaI_3$ is mixed with $Li_3N$, the mixture is placed in a pressure vessel and heated by exposure to a resistively heated wire. It was discovered that performing this reaction at pressures in excess of 5 kbar resulted in GaN instead of elemental gallium and nitrogen.

We have also recently discovered that $NH_4Cl$ can be used as an "inert" salt additive in the formation of gallium nitride. The addition of ammonium chloride to gallium (III) iodide and lithium nitride in the proper ratio yields crystalline gallium nitride at ambient pressure conditions.

DRAWINGS

These and other features, aspects and advantages of the present invention will become better understood with reference to the following description and accompanying drawings, where.

DESCRIPTION

Figures 1, 2:
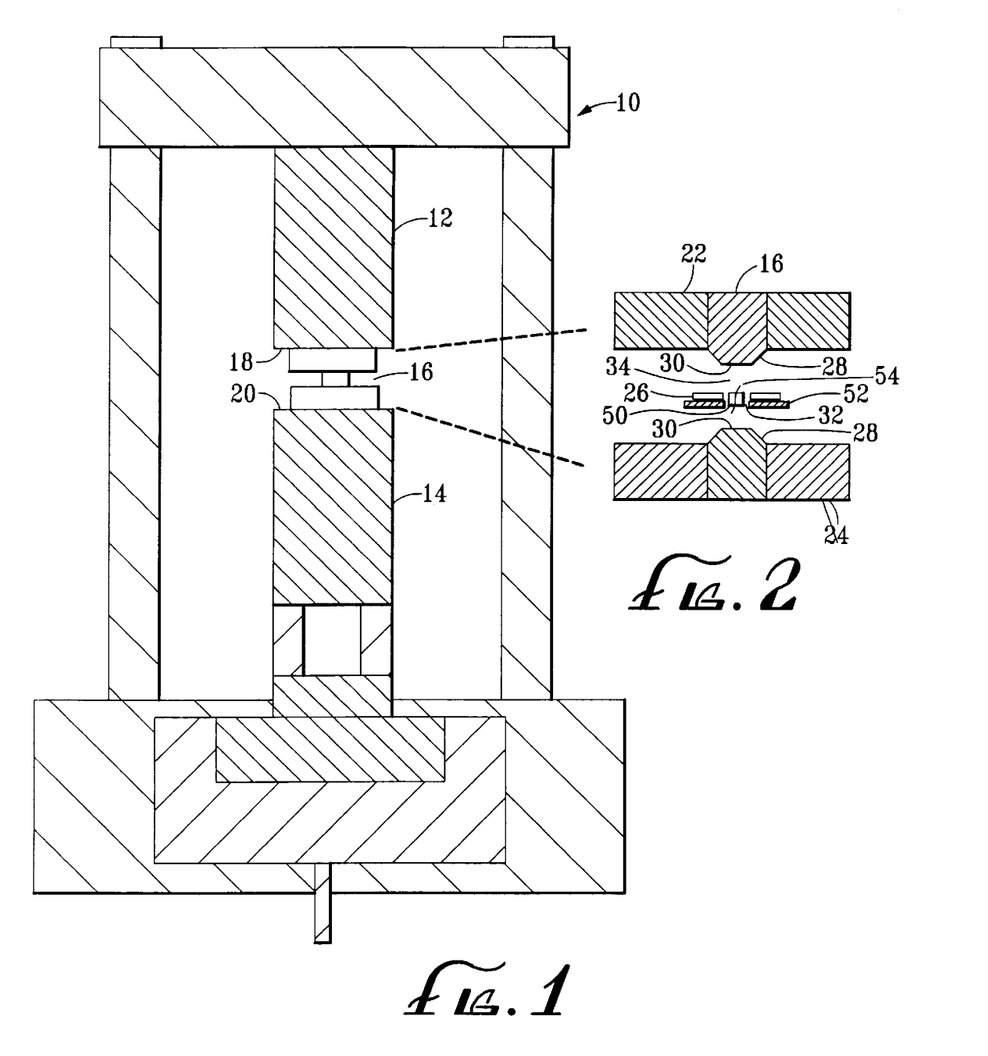
FIG. 1 is a front schematic view of an apparatus used to perform the process embodying features of the invention.
FIG. 2 is an enlarged exploded front schematic view of a first type of reaction chamber used with the apparatus of claim 1.

It has been discovered that high quality, pure, refractory crystalline materials, particularly refractory nitrides and more particularly gallium nitride, can be produced by a solid-state exchange (metathesis) reaction when conducted in a controlled environment at high pressures with initial temperatures being ambient. FIG. 1 shows an apparatus 10 used for performing this reaction. The apparatus 10 is a hydraulic press which includes an upper and lower piston 12, 14 capable of applying pressure on a reactant mixture placed within a reaction fixture 16 positioned between the juxtaposed faces 18, 20 of the upper and lower pistons 12, 14.

FIG. 2 is a first example of a reaction fixture 16 suitable for use to perform the process of the invention. The reaction fixture 16 consists of upper and lower anvils 22, 24, commonly referred to as Bridgman anvils, and washer 26 placed therebetween. The anvils 22, 24 generally include a centrally located tungsten carbide core or pin 28 of a high strength metal which, for a particular embodiment of the invention, is electrically conductive. In use, the anvils 22, 24 are arranged with an exposed end 30 of each facing each other, the washer 26 being placed with the hole 32 between and in the center of the anvil pins 28 to define a space therebetween which functions as a reaction chamber 34. The assembled reaction fixture 16, with the reactants 50 placed in the reaction chamber 34, is then placed between the pistons 12, 14 so that application of pressure to the pistons 12, 14 exerts pressure on the pins 28 and, in turn, the reactants placed within the hole 32 in the washer (i.e., the reaction chamber 34).

Typical dimensions for relevant portions of the reaction fixture 16 using the Bridgman anvils 22, 24 are an anvil pin exposed end 30 of ⅜ inches diameter and an Inconel washer 26 having a thickness of 0.393 inches (1 mm), the centrally located hole 32 having a diameter of 3/16 inch (0.1875 inch).

Figure 3:
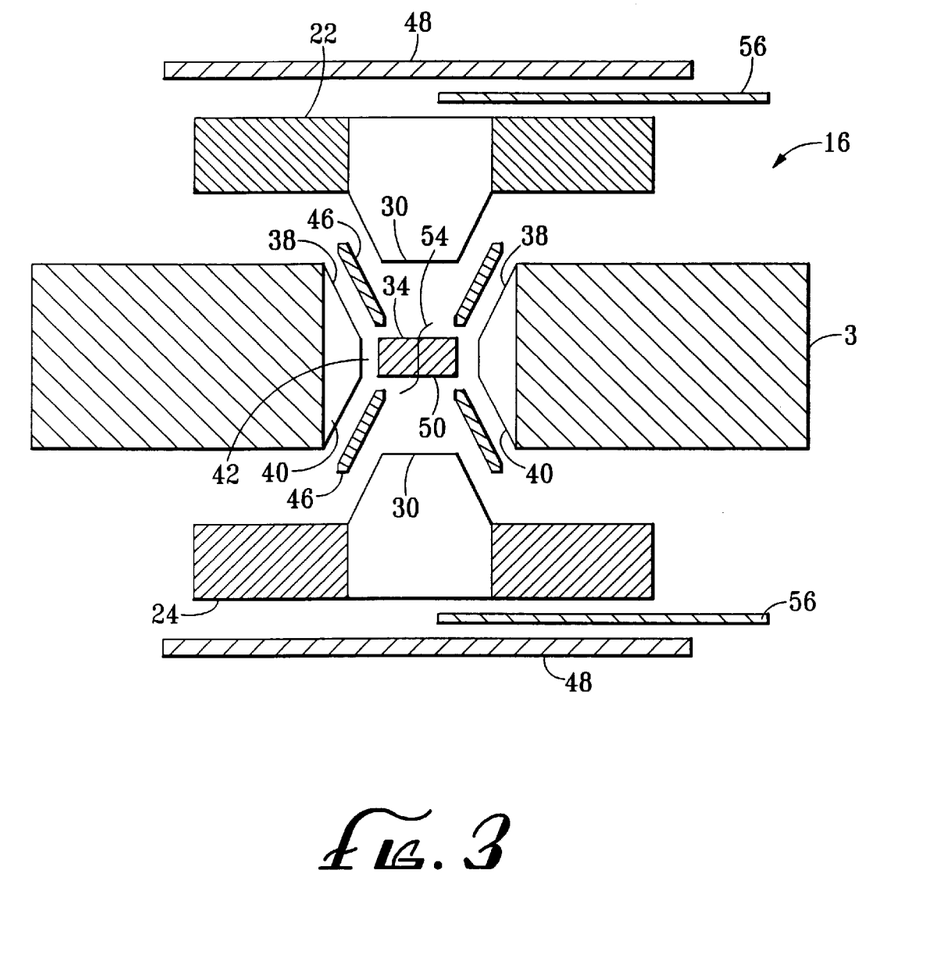
FIG. 3 is an enlarged exploded front schematic view of a second type of reaction chamber used with the apparatus of claim 1.

In a second version of the reaction fixture 16, shown in FIG. 3, the anvil exposed ends 30 have a diameter of 0.5 inch. In place of the washer 26, a thick retaining ring 36 with a central opening having upper and lower tapered surfaces 38, 40 and a circular, vertical central portion 42 of 0.560 inch in diameter is used. The upper and lower tapered surfaces 38, 40 mate with similarly tapered surfaces on the upper and lower anvils 22, 24. Prior to assembly, electrically insulating, pressure sealing tapered rings made of pyrophillite 46 are placed between the surfaces to be mated and an insulator 48 is placed between the upper and lower surface of the assembly and the pistons 12, 14 of the press 10. When the fixture is assembled a circular reaction chamber 34 of 0.560 inch in diameter and 0.150 inch thickness is created between the components.

Using prior art techniques, in which the reactants are reacted under ambient conditions for extended periods of time, $TaCl_5$ has been reacted with $Li_3N$ to produce hexagonal phase TaN with only a trace of the cubic phase.

Using the process and apparatus described above and operating at approximately 30 kbar or greater the same reaction produces primarily cubic phase TaN with only a trace of the hexagonal phase.

Figure 4:
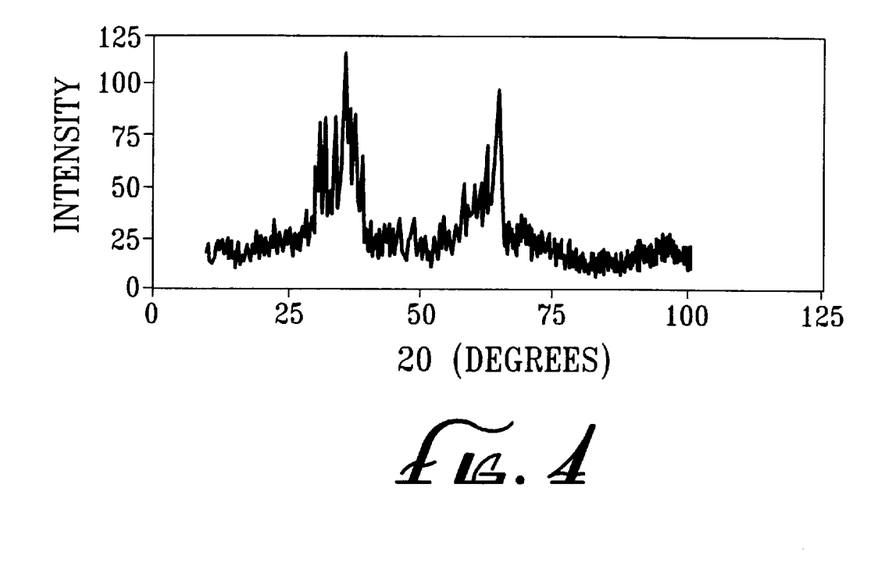
FIG. 4 is an X-ray diffraction pattern elicited from the solid products of the solid-state metathesis reaction at ambient conditions of $GaI_3$ and $Li_3N$.

It has been found that the process and apparatus described above can also be used to synthesize products which are not thermodynamically favored using the same reactants at ambient conditions. GaN can not be formed by using the same solid-state metathesis reactions under ambient conditions. Instead, elemental Ga and nitrogen gas are produced according to the formula:

(1)

along with various soluble compounds of gallium, such as oxides. The solid reaction product of the ambient reaction, all of which are soluble in aqueous or acid solutions, has the X-ray diffraction pattern shown in FIG. 4. This is consistent with the absence of GaN in the product.

Figure 5:
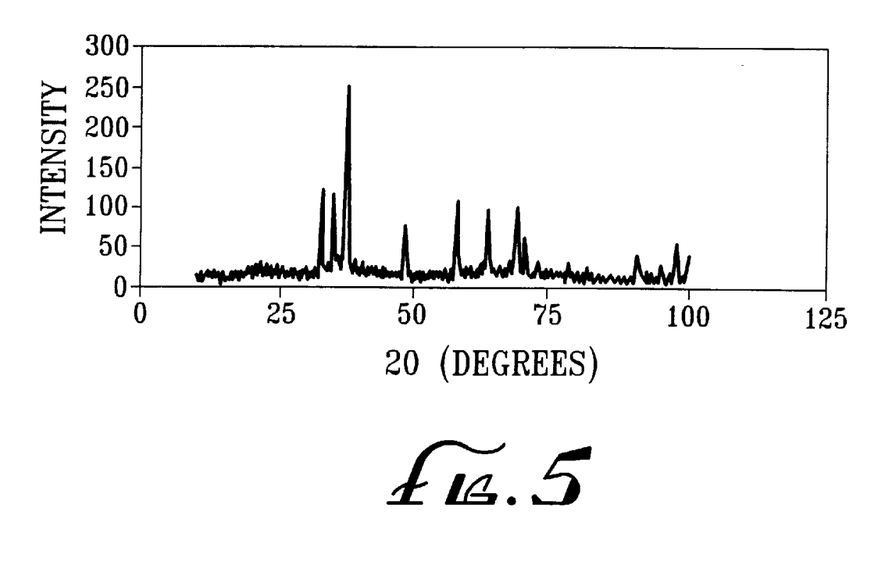
FIG. 5 is an X-ray diffraction pattern elicited from the solid products of the solid-state metathesis reaction at 45 kbar of $GaI_3$ and $Li_3N$.

It has been found that when this reaction is performed using the apparatus and process described above under high pressure conditions (25–40 kbar), GaN is preferentially produced instead of Ga and $N_2$ gas. FIG. 5 shows the X-ray diffraction pattern for the nonsoluble reaction product. This material, which has been determined to be pure crystalline GaN, fluoresces with an intense blue violet glow, the photoluminescence spectra thereof being shown in FIG. 6.

Figure 6:
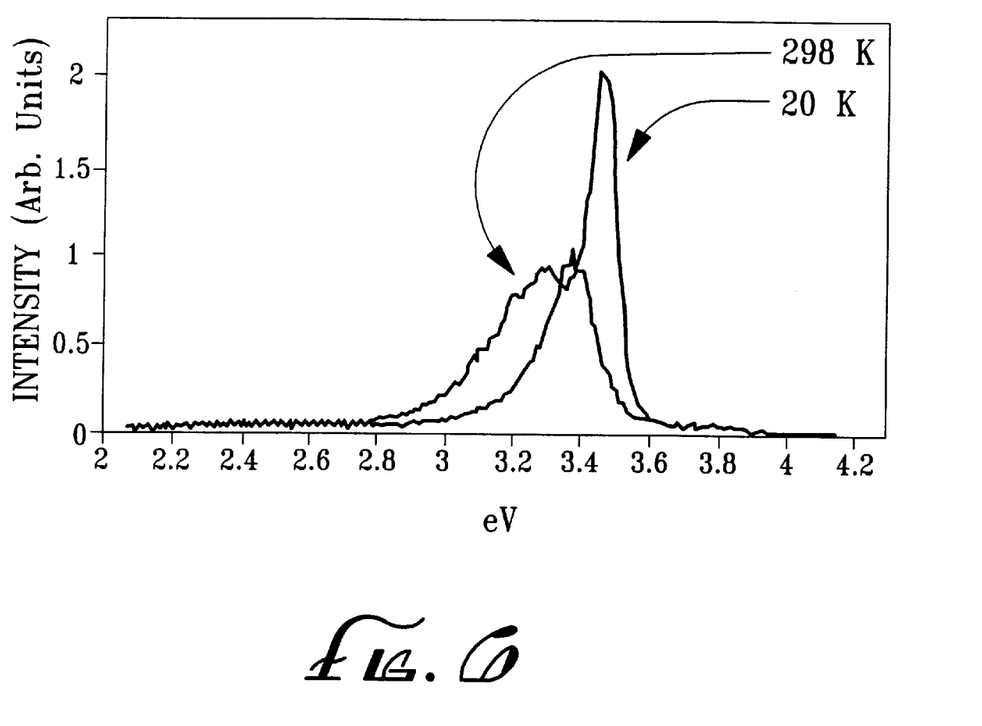
FIG. 6 shows the photoluminescence spectra at 298° K. and 20° K. of a GaN sample produced at 45 kbar.

The high quality of the gallium nitride produced by metathesis under 4.5 GPa confining pressure is apparent in the photoluminescence spectra shown in FIG. 6. The excitation source is 5 ns, 20 μJ pulse of 266 nm radiation. The room temperature 298 K spectrum (FIG. 6, bottom) reveals only the 3.38(3) eV band gap characteristic of bulk gallium nitride. The low temperature (20K) spectrum (FIG. 6 upper curve) is also consistent with high quality bulk GaN with a sharp excitonic transition at 3.45(3) eV and lower energy features originating from known donor-acceptor pair recombination. The photoluminescence measurements do not show either size effects or surface states, consistent with micron-scale, rather than nano-scale, crystallites. This is confirmed by scanning electron microscopy and a negligible amount of line broadening measured in the X-ray diffraction pattern (FIG. 5) when compared to an external silicon standard.

The high pressure solid-state metathesis process incorporating features of the invention, has also been shown to produce $Si_3N_4$ according to the formula:

These reactants produce a totally different product under ambient conditions.

EXAMPLE 1

GaN was prepared using the apparatus shown in FIGS. 1 and 2 and described above. The Inconel washer 26 was coated with a paste 52 composed of magnesia (MgO) and alumina ($Al_2O_3$) in an epoxy binding material to electrically insulate the washer from the two anvils 22, 24. A pellet of reactants 50 was prepared by intimately mixing 0.08353 g of $GaI_3$ and 0.00646 g of $Li_3N$ in a moisture free helium atmosphere and the mixture was placed within the hole 32 in the washer 26 with a conductive fine gauge iron wire 54 vertically arranged through the center of the pellet 50 such that when placed between the anvils 22, 24 the anvils are in contact with the opposite ends of the wire 54. While maintaining the inert atmosphere around the pellet 50 the reaction fixture 16 was assembled, placed in the press 10 with the ends of the hydraulic pistons 18, 20 in the press electrically insulated from the anvils by a PVC sheet 48 (see FIG. 3), and 45,227 lbs force was applied to the ⅜ inch anvils 12, 14, resulting in approximately 28.2 kbar being applied to the pellet 50. An electrical current (0.5 to 1 amp) was then applied to the anvils via copper leads 56 (see FIG.

3), the current flowing through the iron wire 54 in the center of the pellet 50 causing the wire 54 to heat to greater than 227° C., the reaction occurring and being complete in a few seconds. The fixture was then disassembled, the powdered product washed with water and acid to remove all soluble salts produced in the reaction and the insoluble material collected, which was approximately 30%$_w$ of the reaction product, and analyzed. The X-ray diffraction pattern and photoluminescence spectra of the collected insoluble material is shown in FIGS. 5 and 6.

EXAMPLE 2

GaN was prepared using the apparatus 10 shown in FIGS. 1 and 3 and described above. The upper and lower tapered surfaces 38, 40 of the thick retaining ring 36 were electrically insulated from the two anvils 22, 24 by tapered pyrophyllite insulating rings 46. A pellet of reactants 50 was prepared by intimately mixing 1.6059 g of GaI$_3$ and 0.1241 g of Li$_3$N in a moisture free helium atmosphere and the mixture was placed within the central vertical portion of the ring 36 with a 1.5 cm length of a conductive fine gauge iron wire 54 vertically arranged through the center of the pellet 50 such that when placed between the anvils 22, 24 are in contact with the opposite ends of the wire 54. The pellet 50 had a volume of about 0.0369 in$^3$. While maintaining the inert atmosphere around the pellet 50 the reaction fixture 16 was assembled, placed in the press 10 with the ends of the hydraulic pistons 18, 20 in the press electrically insulated from the anvils by a PVC sheet 48, and force was applied to the anvils 22, 24. Several different experiments were run with pressures of from 84,530 to 127,000 pounds of force applied to the ½ inch diameter anvils, creating a force on the pellet 50 of from 29.7 to 44.8 kbar. An electrical current (0.5 to 1 amp) was then applied to the anvils 22, 24, the current flowing through the iron wire 54 in the center of the pellet 50 causing the wire 54 to heat to greater than 227° C., the reaction occurring and being complete in a few seconds. The fixture was then disassembled, the powdered product washed with water and acid to remove all soluble salts produced in the reaction and the insoluble material collected, which was approximately 30%$_w$ of the reaction product, and analyzed. The X-ray diffraction pattern and photoluminescence spectra of the collected insoluble material in each experiment was substantially as shown in FIGS. 5 and 6.

It has now been further discovered that the refractory nitrides, particularly GaN can be produced under ambient pressure conditions if appropriate amounts of preferred reactive salt is mixed with the reactants. A suitable reactive salt is ammonium chloride (NH$_4$Cl).

In contrast with the prior art regarding addition of "inert" salts, such as LiCl, LiI or NaCl, used to lower the temperature of the reaction between gallium (III) iodide and lithium nitride, ammonium chloride does participate in the reaction and does result in GaN being formed of suitable crystallinity. Due to the exothermic nature of this metalhesis reaction (1) (C. H. Wallace, S-H Kim, G. A. Rose, L. Rao, J. R. Heath, M. Nicol, R. B. Kaner, *Appl. Phys. Lett.*,72, 5 (1998)), the reaction reaches a maximum temperature of 1443 K. The temperature of the reaction of gallium (III) iodide and lithium nitride can be lowered by several hundred degrees by the addition of NH$_4$Cl. This reaction is particularly sensitive to the amount of NH$_4$Cl that is added to the reaction. As shown in Table 1 when too little NH$_4$Cl is added, the reaction temperature is too high and Ga and nitrogen are the preferential products. On the other hand, if too much NH$_4$Cl is added, the reaction does not produce enough heat and/or the reactants are too diluted to form crystalline GaN. However, it was discovered that selecting the proper intermediate quantity of NH$_4$Cl preferentially resulted in the formation of GaN.

TABLE 1

Summary of reactions to produce GaN at ambient conditions with NH$_4$Cl added in the molar ratios indicated.

| GaI$_3$ | Li$_3$N | NH$_4$Cl | Results |
|---|---|---|---|
| 1 | 1 | 0.5 | Ga + N$_2$ |
| 1 | 1 | 1 | Ga + N$_2$ |
| 1 | 1 | 1.5 | Ga + N$_2$ |
| 1 | 1.33 | 0.5 | Ga + N$_2$ |
| 1 | 1.33 | 1 | GaN |
| 1 | 1.33 | 1.5 | poorly crystalline GaN |
| 1 | 1.33 | 2 | poorly crystalline GaN |
| 1 | 1.33 | 2.5 | Ga + N$_2$ |
| 1 | 2 | 0.5 | Ga + N$_2$ |
| 1 | 2 | 1.5 | Ga + N$_2$ |
| 1 | 2 | 2 | poorly crystalline GaN |
| 1 | 2 | 2.5 | poorly crystalline GaN |
| 1 | 2 | 3 | most crystalline GaN |
| 1 | 2 | 3.5 | Ga + N$_2$ |
| 1 | 2 | 4 | Ga + N$_2$ |
| 1 | 2 | 6 | Ga + N$_2$ |

The reaction that appears to produce the highest yield of the most crystalline product is shown below in equation (2).

$$GaI_3 + 2Li_3N + 3NH_4Cl ===> GaN + 3LiI + 3NH_3 + 3HCl + 3Li + N_2 \Delta H_{reaction}° = -351.6kj*T_{max} = 613K* \quad (2)$$

(*These numbers are approximate because not all of the NH$_4$Cl is decomposed and proper analysis of the decomposition products has not been done).

Figure 7A:
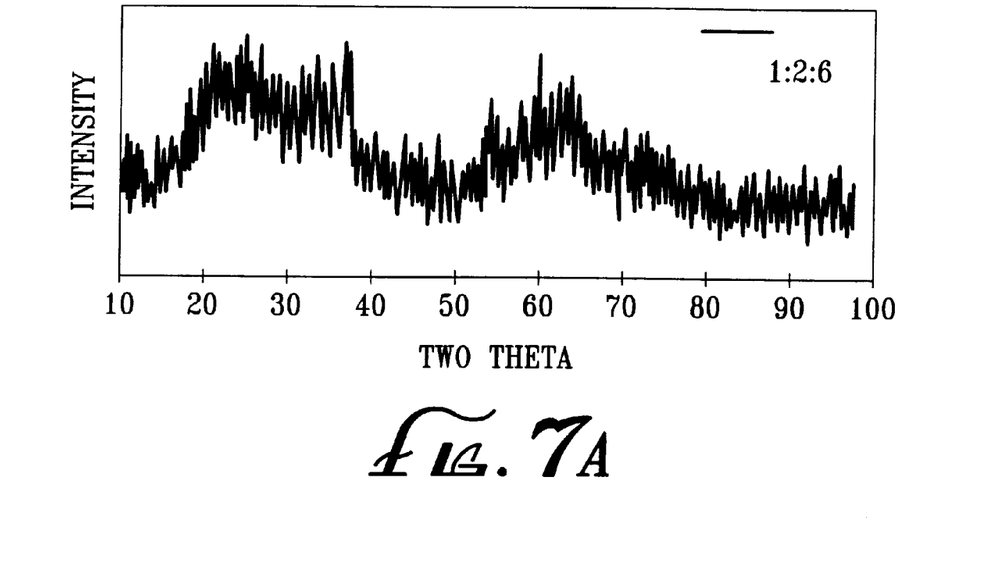
FIG. 7a and FIG. 7b are x-ray diffraction patterns elicited with $GaI_3:Li_3N:NH_4Cl$ in ratios of 1:2:6 and 1:2:2 respectively.
Figure 7B:
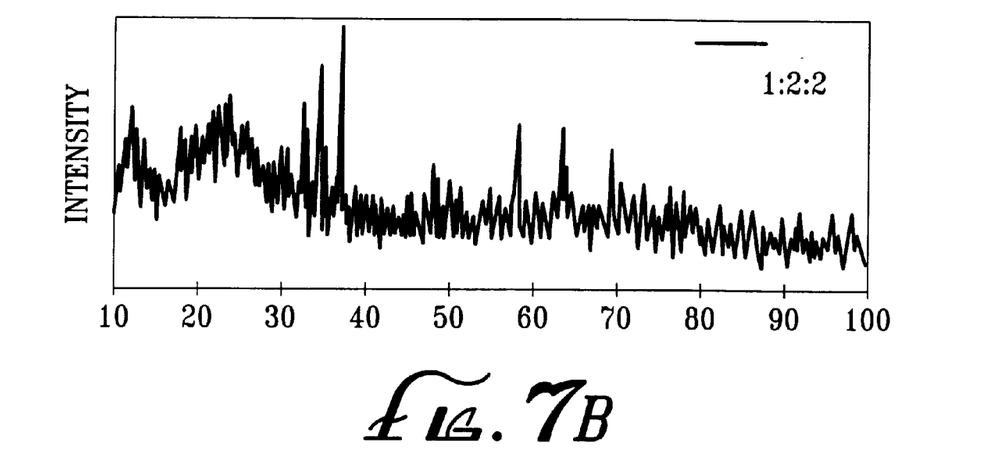
Figure 8:
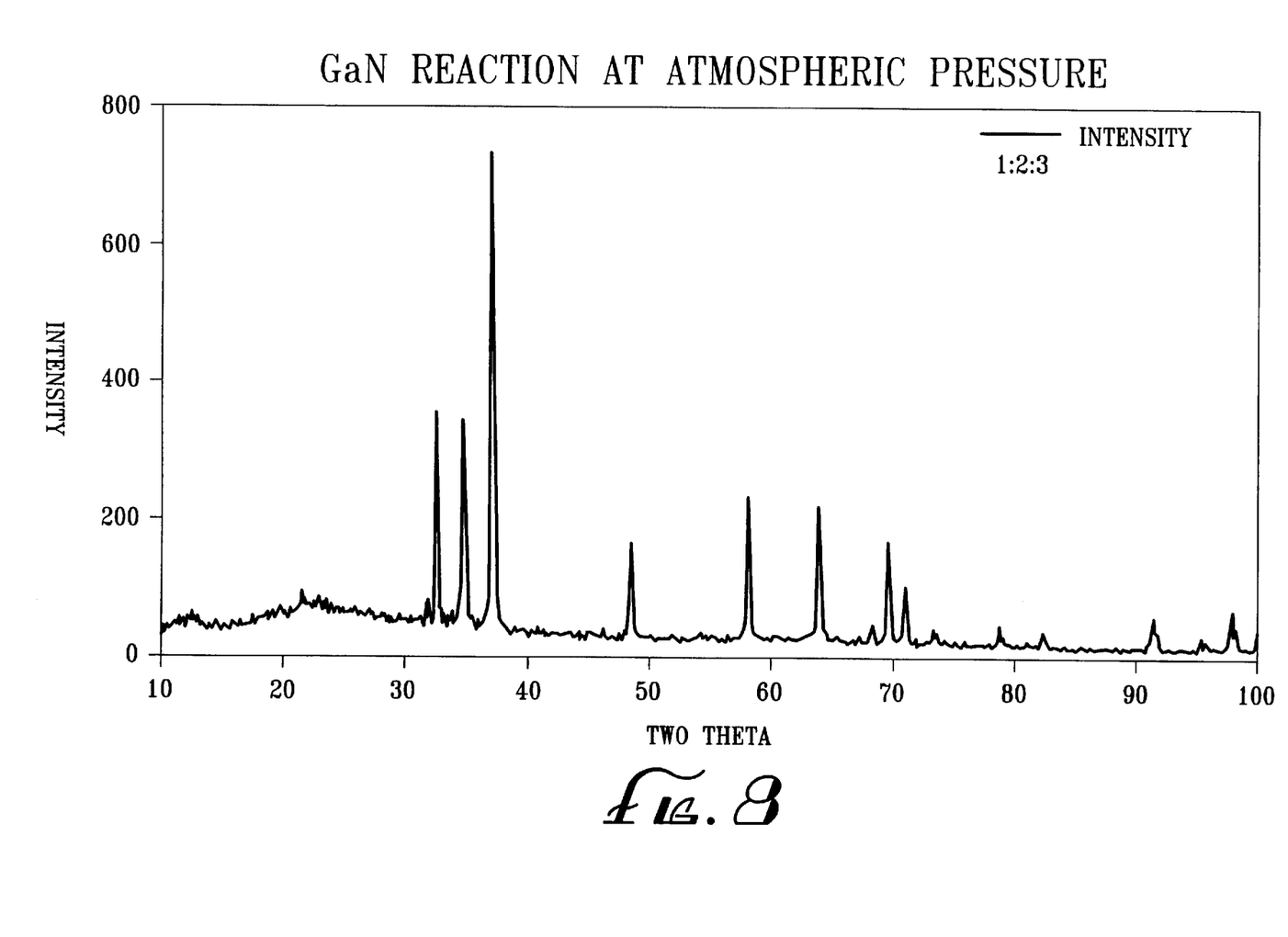
FIG. 8 is an x-ray diffraction pattern elicited with $GaI_3:Li_3N:NH_4Cl$ in ratios of 1:2:3.

If too much NH$_4$Cl is added to the reaction (>1:2:6 mole ratio of GaI$_3$:Li$_3$N:NH$_4$Cl), all products dissolve in polar solvents, indicating that the reaction did not go to completion and no GaN was formed. If not enough NH$_4$Cl is added (<1:2:2), the reaction produces too much heat which makes the formation of GaN unfavorable. As can be seen from FIGS. 7a, 7b and 8, the amount of NH$_4$Cl added to the reaction significantly effects the crystallinity of the product. The x-ray diffraction pattern shown in FIGS. 7a and 7b show that GaN is not formed with ratios of 1:2:6 or 1:2:2. As shown in FIG. 8, the preferred ratio is 1:2:3 mole ratio of GaI$_3$:Li$_3$N:NH$_4$Cl.

The order of mixing of the three reactants is not essential to the formation of GaN as long as an intimate mixture of the three precursors is achieved. GaI$_3$ and Li$_3$N must be intimately mixed prior to the addition of NH$_4$Cl in order for the reaction to produce enough heat to crystallize GaN. Several factors likely contribute to this phenomenon. The first is shown in equation (3) where it is necessary for the GaI$_3$ and Li$_3$N to be in intimate contact for this reaction to occur. The heat produced by equation (3) likely initiates equation (4) and causes the decomposition of NH$_4$Cl to ammonia and HCl. The conventional method of producing GaN powders is to pass ammonia gas over Ga metal at elevated temperatures (usually ~1100° C.). Equation (5) represents a combination of the heated Ga reacting with a nitrogen source to produce the nitride. The reaction initiates, propagates and is completed in less than one second. A possible mechanism is the combination of equations 3–5:

$$GaI_3 + Li_3N ===> Ga^{+3} + N^{3-} + 3LiI \quad (3)$$

$$NH_4Cl ===> NH_3 + HCl \quad (4)$$

$$Ga^{+3} + NH_3 + N^{3-} ===> GaN + \tfrac{1}{2}N_2 + \tfrac{3}{2}H_2 \quad (5)$$

In a similar manner, this process can be used to synthesize TaN, CrN, and Mo$_2$N.

EXAMPLE 3

The solid precursors, gallium (III) iodide, lithium nitride and ammonium chloride are weighed out in the proper molar ratios (typically 2.1520 g GaI$_3$+0.3328 g Li$_3$N+0.7666 g N$_4$H Cl) under an inert helium (oxygen and moisture free) atmosphere. The reactants are then ground together in an agate mortar and pestle and placed into a steel reaction bomb. The steel bomb is equipped with a detonation wire which can be resistively heated to greater than 225° C. to initiate the reaction in a confined environment. The confined environment is not essential, as the reaction will propagate and form GaN in an open container as long as it is oxygen-free. The confined environment is used only as a matter of convenience to prevent loss of material. After detonation, the reaction instantly propagates, reaches a maximum temperature of approximately 800° C. in about one second and cools to room temperature in less than one minute. The products are then removed from the inert atmosphere and washed with an appropriate polar solvent, usually water or methanol. If it is necessary to isolate the product in an inert environment; this can be accomplished by washing with a nonaqueous polar solvent such as acetonitrile. The product is then isolated using a vacuum filtration and then dried in air. The product may also be washed in a dilute acid (0.5 M HCl$_{(aq)}$) solution to remove any unreacted starting materials that has reacted with water to form GaO$_2$H and/or Ga(OH)$_3$.

When larger quantities of reactants are used, the amount of ammonium chloride added to the reaction needs to be increased in comparison to the other materials, the ratio of which is maintained. This is due to the fact that the reaction reaches a higher temperature for a longer period of time when the amounts of the reactants are increased significantly. It has been determined experimentally that the amount of ammonium chloride must be increased to keep the temperature low when the reaction is performed on a large scale to produce large quantities of GaN. An optimum increased quantity of NH$_4$Cl for larger batches has not yet been determined.

To demonstrate the potential for device fabrication, pulsed laser deposition (PLD) of the resultant GaN powder was used to grow thin polycrystalline GAN films on MgO substrates. A pressed pellet of GaN powder was used as a rotating target in a vacuum chamber with a pressure $\leq 5 \times 10^{-8}$ Torr during growth. The target was preablated to remove any surface contaminants. A 50 ml pulsed Eximer laser (248 nm) with a fluence of ~21/cm$^2$ at a pulse repetition rate of 1 Hz for 4 hours enable films of 800 Å thickness to be grown on a MgO substrate heated to 580° C. A bright blue photoluminescence generated is a secondary reflection from the GaN. The primary, bright reflection is a white spot. Although the high energy pulsed laser caused irreversible damage to the thin film after 1,000 laser shots, the photoluminescence spectrum (FIG. 6) reveals the signature of GaN with a good signal to noise ratio.

It is believed that the process described above can be used to produce the preferred forms of many other crystalline refractory materials such as rhombohedral or cubic BN rather than the more thermodynamically favored phases (under ambient conditions) of these materials.

Although the present invention has been described in considerable detail with reference to certain preferred versions and uses thereof, other versions and uses are possible. Therefore, the spirit and scope of the invention should not be limited to the description of the preferred versions contained herein.

What is claimed is:

1. A method of preparing a metal nitride comprising:
   a) mixing stoichiometric quantities of a powdered metal halide with a powdered alkali metal nitride to form a substantially uniform blend, said mixing being done in an inert atmosphere,
   b) adding a predetermined amount of a powdered ammonium halide to the uniform blend to form a reaction mixture while maintaining the inert atmosphere,
   c) placing the reaction mixture in a reaction vessel without exposing the reaction mixture to a reactive amount of oxygen,
   d) rapidly heating the reaction mixture to an elevated temperature, said heating causing a chemical reaction to occur and the desired inorganic nitride to be formed, the temperature of the reaction not exceeding about 800° C.; and
   d) separating the desired inorganic nitride from other compounds formed in the reaction, recovering a pure crystalline nitride.

2. The method of claim 1 for preparing a metal nitride wherein the powdered metal halide is selected from the group consisting of halides of gallium, chromium, tantalum and molybdenum.

3. The method of claim 1 for preparing a metal nitride wherein the alkali metal nitride is Li$_3$N.

4. The method of claim 1 for preparing metal nitrides wherein the means for creating the elevated temperature is an electrical current applied to an electrically conductive wire placed within the reactants and in contact with a source of electric energy.

5. The method of claim 1 for preparing metal nitrides wherein the elevated temperature is at least about 225° C.

6. The method of claim 1 for preparing metal nitrides wherein the inorganic nitrides are selected from the group consisting of gallium (III) nitride, tantalum nitride, chromium and molybdenum nitride.

7. The method of claim 1 for preparing metal nitrides wherein the metal nitride is gallium (III) nitride and the reactants are GaI$_3$, Li$_3$N and NH$_4$Cl.

8. The method of claim 7 for preparing a metal nitride wherein the pressure is about 1 atmosphere and the temperature is greater than about 225° C.

9. The method of claim 7 for preparing a metal nitride wherein the ratio of GaI$_3$ to Li$_3$N to NH$_4$Cl is 1:2:3.

10. A method of preparing crystalline gallium nitride comprising:
    a) mixing, in an inert, oxygen free environment, one mole of GaI$_3$, two moles of LiN$_3$ and at least 3 moles of NH$_4$Cl to form a reaction mixture,
    b) placing the reaction mixture in a sealed chamber containing an exposed wire, and
    c) resistively heating said wire to at least about 225° C. to initiate a chemical reaction in the reaction mixture, forming a reaction product containing the crystalline GaN.

11. The method of claim 10 wherein the inert atmosphere is helium.

12. The method of claim 10 further including washing the reaction product in a polar solvent to remove components of the reaction product soluble therein, leaving substantially pure, crystalline GaN.

13. The method of claim 12 further including washing the substantially pure, crystalline GaN with a dilute acid to remove any undesired gallium by-products.

14. The method of claim 10 further including the addition to step a) of additional NH$_4$Cl as is necessary to limit the temperature of the chemical reaction to no greater than about 800° C.

* * * * *